(12) United States Patent
Takahashi

(10) Patent No.: US 12,431,629 B2
(45) Date of Patent: Sep. 30, 2025

(54) ANTENNA DEVICE INCLUDING DIFFERENT ELECTROMAGNETIC BAND GAP (EBG) ELEMENTS

(71) Applicant: Sony Semiconductor Solutions Corporation, Kanagawa (JP)

(72) Inventor: Yudai Takahashi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 127 days.

(21) Appl. No.: 18/009,540

(22) PCT Filed: Jul. 9, 2021

(86) PCT No.: PCT/JP2021/025926
§ 371 (c)(1),
(2) Date: Dec. 9, 2022

(87) PCT Pub. No.: WO2022/019148
PCT Pub. Date: Jan. 27, 2022

(65) Prior Publication Data
US 2023/0238708 A1    Jul. 27, 2023

(30) Foreign Application Priority Data
Jul. 21, 2020    (JP) .................................. 2020-124390

(51) Int. Cl.
*H01Q 13/08* (2006.01)
*H01Q 1/38* (2006.01)
*H01Q 1/52* (2006.01)

(52) U.S. Cl.
CPC ............... *H01Q 13/08* (2013.01); *H01Q 1/38* (2013.01); *H01Q 1/52* (2013.01)

(58) Field of Classification Search
CPC ...... H01Q 15/006; H01Q 13/08; H01Q 1/521; H01Q 1/52; H01Q 1/38; H01Q 1/3233; H01P 1/00; G01S 7/03
See application file for complete search history.

(56) References Cited

U.S. PATENT DOCUMENTS

| 12,166,270 B2 * | 12/2024 | Woo ....................... H01Q 1/243 |
| 2007/0285336 A1 * | 12/2007 | Kamgaing ............. H01Q 1/523 343/895 |
| 2017/0244174 A1 * | 8/2017 | Kawaguchi .......... H01Q 21/065 |

(Continued)

FOREIGN PATENT DOCUMENTS

| JP | 2010199881 A | 9/2010 |
| JP | 2016039541 A | 3/2016 |

(Continued)

OTHER PUBLICATIONS

Machine Translation of WO2013001692 (Year: 2013).*
International Search Report (PCT/ISA/210), International Application No. PCT/JP2021/025926, dated Sep. 14, 2021.

*Primary Examiner* — Raymond R Chai
(74) *Attorney, Agent, or Firm* — Michael Best & Friedrich LLP

(57) ABSTRACT

An antenna device (1) includes an antenna element (6) and a plurality of EBG elements (10), in which the plurality of EBG elements (10) includes a plurality of first EBG elements (11) and a plurality of second EBG elements (12) having a structure different from a structure of the plurality of first EGB elements (11).

20 Claims, 15 Drawing Sheets

(56) References Cited

U.S. PATENT DOCUMENTS

| | | | |
|---|---|---|---|
| 2018/0226727 A1* | 8/2018 | Sato | H01Q 21/28 |
| 2019/0098750 A1* | 3/2019 | Woo | H01Q 9/045 |
| 2023/0238708 A1* | 7/2023 | Takahashi | H01P 1/00 |
| | | | 343/702 |
| 2023/0344144 A1* | 10/2023 | Wennergren | H01Q 15/006 |

FOREIGN PATENT DOCUMENTS

| | | | | |
|---|---|---|---|---|
| JP | 2018129623 A | 8/2018 | | |
| WO | 2008050441 A1 | 5/2008 | | |
| WO | WO-2013001692 A1 * | 1/2013 | | H01Q 15/006 |

* cited by examiner

FIG.2
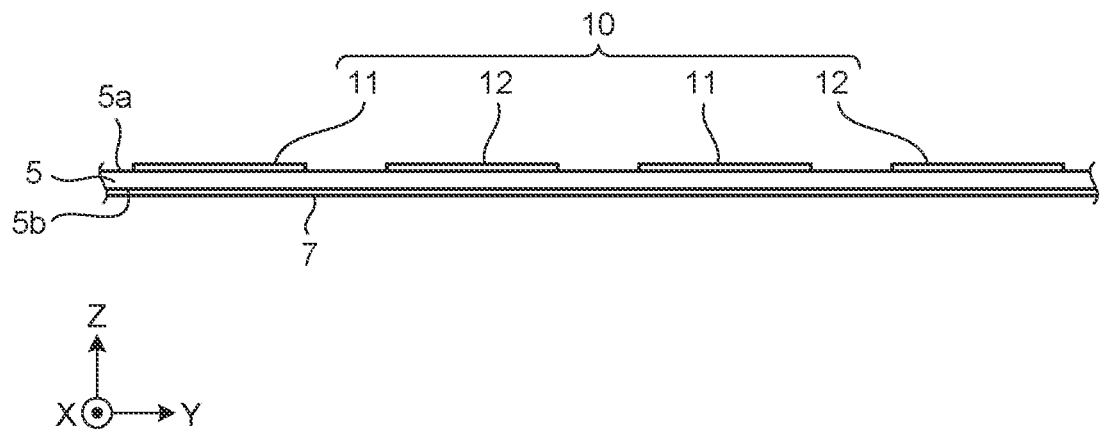
FIG.3
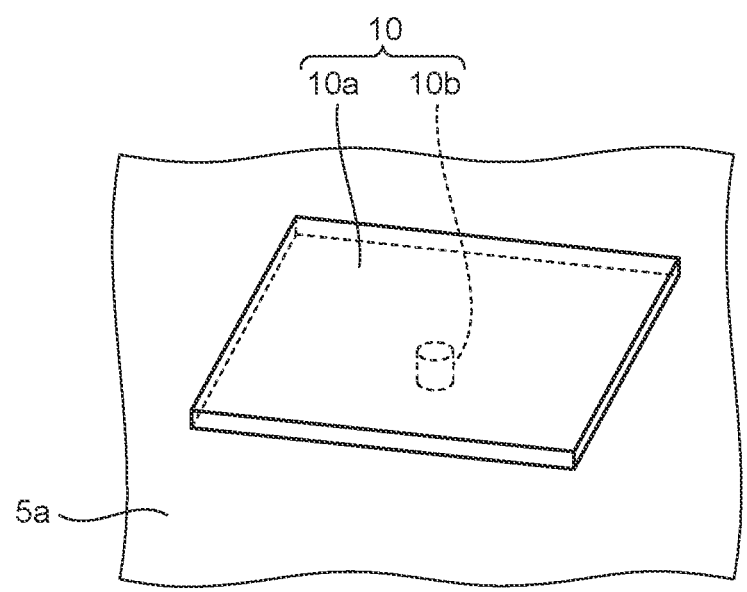
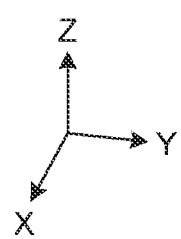

ANTENNA DEVICE INCLUDING DIFFERENT ELECTROMAGNETIC BAND GAP (EBG) ELEMENTS

FIELD

The present disclosure relates to an antenna device.

BACKGROUND

It is known that an electromagnetic band gap (EBG) element is used to attenuate an electromagnetic wave. For example, Patent Literature 1 discloses a method for securing inter-antenna isolation using the EBG element.

CITATION LIST

Patent Literature

Patent Literature 1: JP 2018-129623 A

SUMMARY

Technical Problem

Attenuation characteristics of the electromagnetic wave obtained by the EBG element may not be sufficient. This problem is not studied in Patent Literature 1.

An object of one aspect of the present disclosure is to provide an antenna device capable of improving attenuation characteristics by the EBG element.

Solution to Problem

An antenna device according to one aspect of the present disclosure includes: an antenna element; and a plurality of EBG elements, wherein the plurality of EBG elements includes: a plurality of first EBG elements; and a plurality of second EBG elements having a structure different from a structure of the plurality of first EBG elements.

BRIEF DESCRIPTION OF DRAWINGS

FIG. 2 is a diagram illustrating an example of schematic configuration of the antenna device according to the embodiment.

FIG. 3 is a diagram illustrating an example of a schematic configuration of an EBG element.

DESCRIPTION OF EMBODIMENTS

Hereinafter, embodiments of the present disclosure will be described in detail with reference to the drawings. Note that, in each of the following embodiments, the same parts are denoted by the same reference signs, and redundant description will be omitted.

The present disclosure will be described according to the following order of items shown below.
1. Embodiments
2. Application example
3. Effects

1. Embodiments

Figure 1:
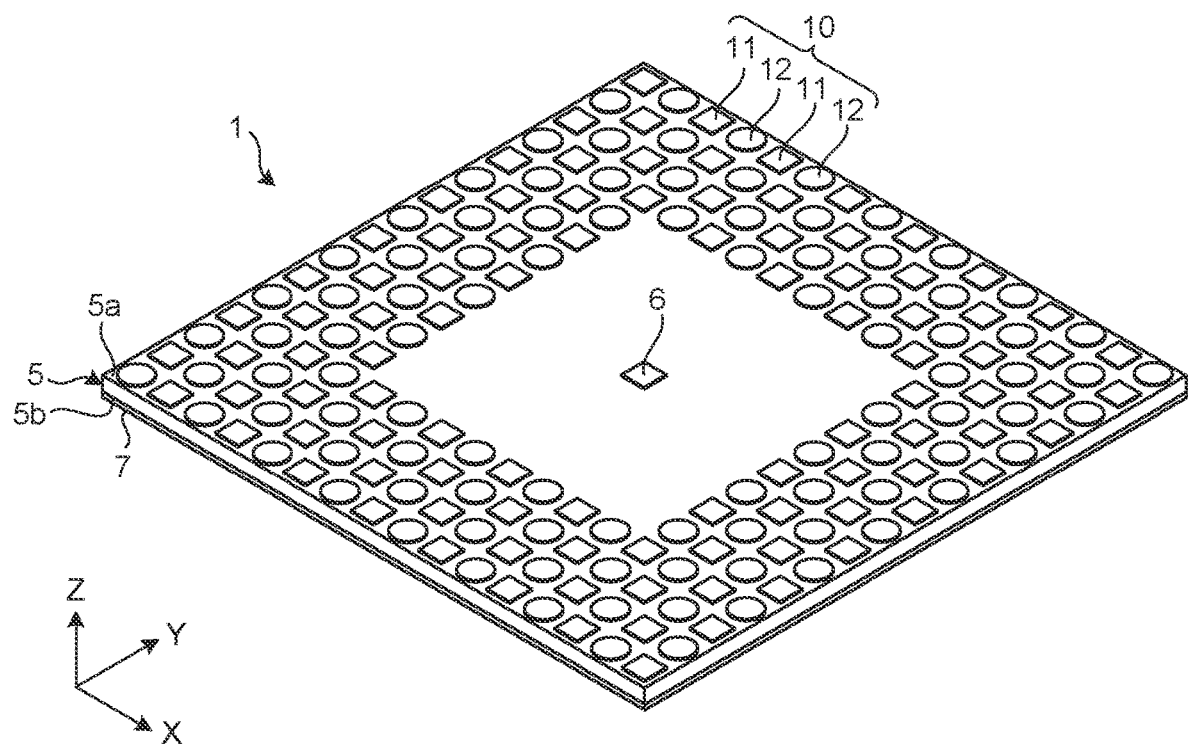
FIG. 1 is a diagram illustrating an example of a schematic configuration of an antenna device according to an embodiment.

FIGS. 1 and 2 are diagrams illustrating an example of a schematic configuration of an antenna device according to an embodiment. An exemplified antenna device 1 is a planar antenna and is provided on a substrate 5. XYZ coordinates are shown in the figure. An X-axis direction and a Y-axis direction correspond to a plane direction of the substrate 5. A Z-axis direction corresponds to a thickness direction of the substrate 5. FIG. 1 is a perspective view of the antenna device 1, and FIG. 2 is a side view of a part of the antenna device 1. The antenna device 1 includes the substrate 5, an antenna element 6, a base plate 7, and a plurality of EBG elements 10.

The substrate 5 is a dielectric substrate made of, for example, resin, ceramic, or the like. An example of the resin is a liquid crystal polymer substrate material (LCP). A surface of the substrate 5 on a side of the positive Z-axis direction is referred to as a main surface 5a in the drawing. A surface of the substrate 5 on a side of the negative Z-axis direction is referred to as a back surface 5b in the drawing.

The antenna element 6 and the base plate 7 will be described. The antenna element 6 performs transmission (including sending) and/or reception of an electromagnetic wave. The shape or the like of the antenna element 6 is appropriately determined according to the specifications or the like of the antenna device 1. In this example, the antenna element 6 is a microstrip antenna (MSL antenna), and is a metal pattern formed on the main surface 5a of the substrate 5. The base plate 7 applies a reference potential. In this example, the base plate 7 is a metal pattern formed on substantially the entire back surface 5b of the substrate 5. Since the antenna element 6 is provided on the main surface 5a of the substrate 5 and the base plate 7 is provided on the back surface 5b of the substrate 5, the antenna device 1 has directivity (main beam) on a side of the main surface 5a of the substrate 5.

The plurality of EBG elements 10 is provided side by side on the main surface 5a of the substrate 5 so as to provide an EBG (electromagnetic band gap). Each of the plurality of EBG elements 10 includes a metal pattern (corresponding to a patch 10a to be described later) provided on the main surface 5a of the substrate 5. The plurality of exemplified EBG elements 10 has a structure called a mushroom structure or the like, and attenuates (blocks) an electromagnetic wave in a specific frequency band. Specifically, the plurality of EBG elements 10 constitutes a transmission path of the electromagnetic wave and gives an attenuation multiplier to the electromagnetic wave in a specific frequency band. The frequency band of the electromagnetic wave attenuated by the attenuation multiplier corresponds to the EBG. Note that hereinafter, the frequency band may be simply referred to as a band.

On the main surface 5a of the substrate 5, the plurality of EBG elements 10 is provided apart from the antenna element 6. By arranging the plurality of EBG elements 10 at a certain distance from the antenna element 6, it is possible to reduce the influence (directivity change, antenna resonance frequency deviation, and the like) on the original radiation characteristics of the antenna element 6. A separation distance between the plurality of EBG elements 10 and the antenna element 6 may be larger than a separation distance between the adjacent EBG elements 10. In the example illustrated in FIG. 1, the plurality of EBG elements 10 is collectively arranged in a region at a constant interval from the antenna element 6. The plurality of EBG elements 10 is provided between the antenna element 6 and an edge of the substrate 5. In this example, the plurality of EBG elements 10 is arranged so as to surround the antenna element 6. As a result, an electromagnetic wave traveling from the antenna element 6 toward the edge of the substrate 5 (traveling in an XY plane direction) is attenuated in the region where the plurality of EBG elements 10 is provided. Furthermore, in the example illustrated in FIG. 1, the region where the plurality of EBG elements 10 is provided extends to the edge of the substrate 5. That is, the region where the plurality of EBG elements 10 is provided includes an edge part of the substrate 5. This makes it easy to secure an arrangement area of the plurality of EBG elements 10. The edge part of the substrate 5 may be defined as, for example, a part where the EBG elements 10 can be provided side by side in a row along the edge of the substrate 5.

If the plurality of EBG elements 10 is not provided, the electromagnetic wave traveling from the antenna element 6 toward the edge of the substrate 5 reaches the edge of the substrate 5 without being attenuated. At least a part of the electromagnetic wave reaching the edge of the substrate 5 goes around to a side of the back surface 5b of the substrate 5. As a result, the electromagnetic wave is radiated in a direction of the back surface 5b of the substrate 5, and unnecessary back lobes are generated. This back lobe is suppressed by an attenuation effect by the plurality of EBG elements 10 described above. The EBG elements 10 will be further described with reference to FIGS. 3 and 4.

Figure 4:
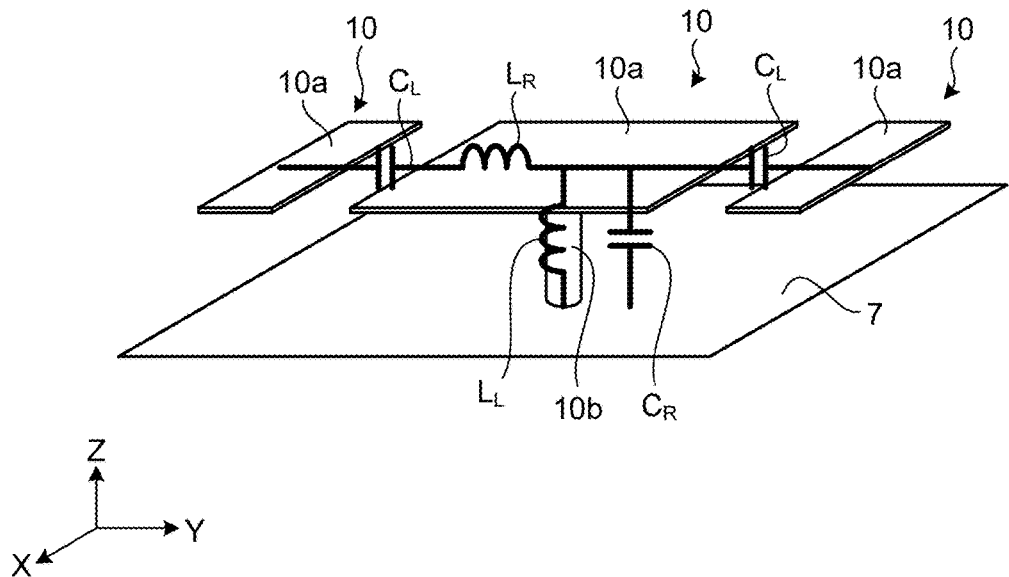
FIG. 4 is a diagram illustrating an example of a schematic configuration of the EBG element.

FIGS. 3 and 4 are diagrams illustrating an example of a schematic configuration of an EBG element. Although the shape of the exemplified EBG element 10 is similar to the shape of an EBG element 11 among the EBG element 11 and an EBG element 12, the following description is applied to both the EBG element 11 and the EBG element 12. Note that FIG. 4 illustrates an example of an equivalent circuit of the EBG element 10 in an overlapping manner while illustration of the substrate 5 is omitted. As illustrated in FIGS. 3 and 4, the EBG element 10 includes a patch 10a and a via 10b. The patch 10a is, for example, a metal pattern formed on the main surface 5a of the substrate 5 as described above. One end of the via 10b is connected to the patch 10a, the other end is connected to the base plate 7, and the patch 10a is connected to the base plate 7.

The patch 10a of the EBG element 10 has inductance in its extending direction (XY plane direction), and this inductance constitutes a coil $L_R$ of the equivalent circuit.

The patches 10a of the adjacent EBG elements 10 form a capacitance, and this capacitance constitutes a capacitor $C_L$ of the equivalent circuit.

The via 10b of the EBG element 10 has an inductance in the extending direction (Z-axis direction), and this inductance constitutes a coil $L_L$ of the equivalent circuit.

The patch 10a of the EBG element 10 and the base plate 7 provide capacitance, and this capacitance constitutes $C_R$ of the equivalent circuit.

Since the plurality of EBG elements 10 is provided side by side, an series circuit of the capacitor $C_L$ and the coil $L_R$ repeatedly exists in the series direction. Each LC series circuit is connected to the base plate 7 via a parallel circuit of the coil $L_L$ and the capacitor $C_R$. Therefore, the equivalent circuit illustrated in FIG. 4 is obtained.

For example, the attenuation characteristics of the electromagnetic wave by the plurality of EBG elements 10 can be designed by adjusting values (inductance and capacitance) of the elements in the above-described equivalent circuit. Examples of the attenuation characteristics include an attenuation bandwidth, an attenuation amount, and the like. The values of the elements can be adjusted by changing parameters that define the structure of the plurality of EBG elements 10. Some examples of the parameters will be described.

A first example of the parameters is a size (via size) of the via. 10b of the EBG element 10. If the via has a circular cross-sectional shape, the via size may be via diameter. The inductance of the coil $L_L$ can be adjusted by changing the via size.

A second example of the parameters is a size (patch size) of the patch 10a of the EBG element 10. The inductance of the coil $L_R$ and the capacitance of the capacitor $C_R$ can be adjusted by changing the patch size. The adjustment of the patch size includes a change in a patch length, a patch width, a patch area, a patch shape, and the like. Examples of the shape of the patch include a circular shape, a polygonal shape, and the like.

A third example of the parameters is an interval between the adjacent EBG elements 10, more specifically, an interval (patch interval) between the adjacent patches 10a. The capacitance of the capacitor $C_L$ can be adjusted by changing the patch interval.

For example, the attenuation characteristics of the plurality of EBG elements 10 can be designed by adjusting the parameters as described above. Here, if the plurality of EBG elements 10 has a single structure, there is a case where sufficient attenuation characteristics cannot be obtained, for example, the attenuation bandwidth is too narrow or the attenuation amount is too small. If the attenuation characteristics are not sufficient, for example, the backlobe suppressing effect is also reduced. Therefore, in the antenna device 1, the plurality of EBG elements 10 includes a plurality of EBG elements 11 (a plurality of first EBG elements) and a plurality of EBG elements 12 (a plurality of second EBG elements). The plurality of EBG elements 12 has a structure different from that of the plurality of EBG elements 11. From the viewpoint of the above parameters, parameters defining the plurality of EBG elements 12 are different from parameters defining the plurality of EBG elements 11.

Among the parameters, three parameters of the via size, the patch size, and the patch interval exemplified above will be described. The via size is not particularly illustrated in FIG. 1, and the via sizes of the plurality of EBG elements 11 and the plurality of EBG elements 12 may be the same or different.

Regarding the patch size, the patch sizes of the plurality of EBG elements 11 and the plurality of EBG elements 12 are set such that the patches of the EBG elements 11 have a quadrangular shape and the patches of the EBG elements 12 have a circular shape.

Regarding the patch interval, the patch intervals of the plurality of EBG elements 11 and the plurality of EBG elements 12 are set such that each of the plurality of EBG elements 11 and each of the plurality of EBG elements 12 are alternately arranged. Note that, in the example illustrated in FIG. 1, each of the plurality of EBG elements 11 and each of the plurality of EBG elements 12 are alternately arranged in the X-axis direction and the Y-axis direction.

Here, since the plurality of EBG elements 12 has a different structure from the plurality of EBG elements 11, the attenuation characteristics provided by the plurality of EBG elements 12 are different from the attenuation characteristics provided by the plurality of EBG elements 11. Therefore, attenuation characteristics combining two different attenuation characteristics can be obtained. For example, as compared with a case where only one attenuation characteristic is given, the attenuation characteristic is improved such that a wider attenuation bandwidth is obtained or a larger attenuation amount is obtained. By improving the attenuation characteristics, for example, the backlobe suppressing effect can be improved.

Note that a plurality of EBG elements having various structures may be used in addition to the plurality of EBG elements 11 and the plurality of EBG elements 12 described above. An example will be described with reference to FIG. 5.

Figure 5:
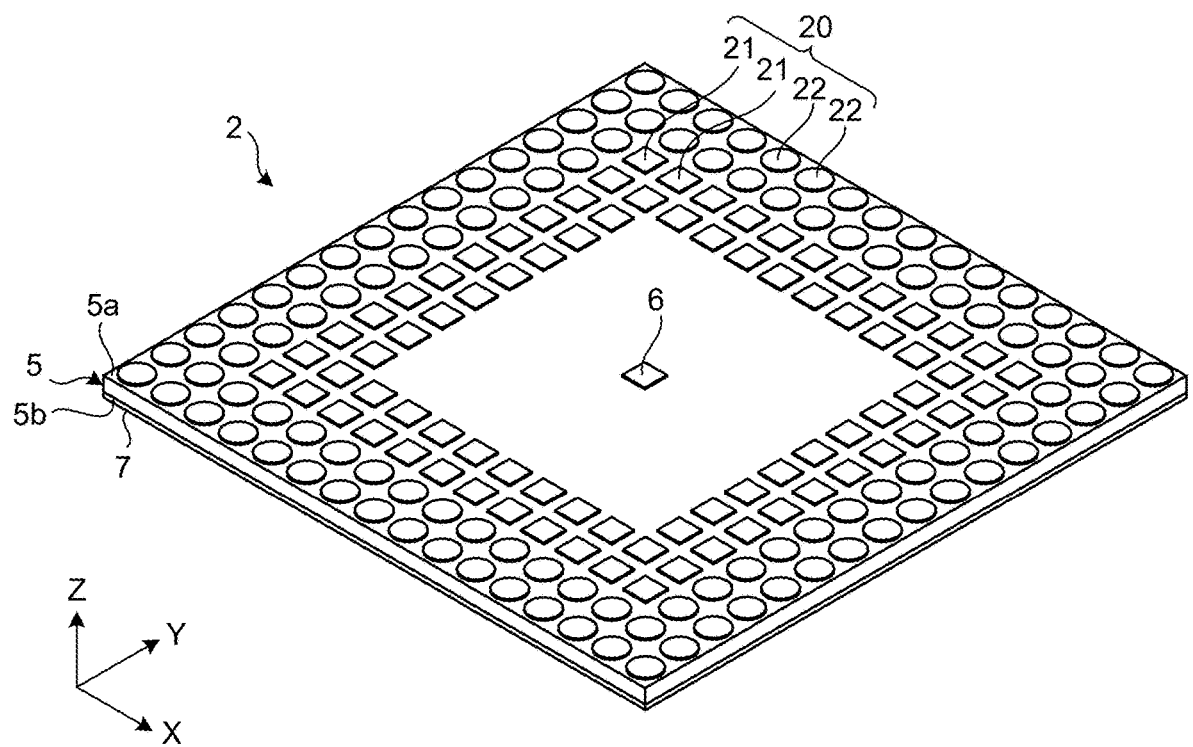
FIG. 5 is a diagram illustrating an example of a schematic configuration of the antenna device according to the embodiment.

FIG. 5 is a diagram illustrating an example of a schematic configuration of an antenna device according to the embodiment. An exemplified antenna device 2 is different from the antenna device 1 (FIG. 1) in that the antenna device 2 includes a plurality of EBG elements 20 instead of the plurality of EBG elements 10. The plurality of EBG elements 20 includes a plurality of EBG elements 21 (a plurality of first EBG elements) and a plurality of EBG elements 22 (a plurality of second EBG elements). In this example, the plurality of EBG elements 21 surrounds an antenna element 6, and the plurality or EBG elements 22 surrounds the plurality of EBG elements 21.

Among parameters defining the structures of the plurality of EBG elements 21 and the EBG elements 22, the via size and the patch size are similar to those of the plurality of EBG elements 11 and the plurality of EBG elements 12 (FIG. 1), and thus, the description thereof will not be repeated. Regarding the patch interval, the patch intervals of the plurality of EBG elements 21 and the plurality of EBG elements 22 are set such that the plurality of EBG elements 21 and the plurality of EBG elements 21 are provided in order in a direction from the antenna element 6 toward an edge of a substrate 5 (in the XY plane direction).

Also by the plurality of EBG elements 20 included in the antenna device 2, two different attenuation characteristics are given by the plurality of EBG elements 21 and the plurality of EBG elements 22, so that the attenuation characteristics are improved as compared with a case where only one attenuation characteristic is given.

The results of studying the attenuation characteristics of the antenna device 1 and the antenna device 2 described above will be described with reference to FIGS. 6 to 12.

FIGS. 6 to 10 are diagrams illustrating examples of configurations for studying attenuation characteristics. In the configurations for study, two antenna elements are provided on the same surface of the substrate, and a plurality of EBG elements are provided between the two antenna elements. This is because the attenuation characteristics provided by the plurality of EBG elements can be confirmed by simulating a magnitude of coupling between the two antenna elements in such configurations. Note that, in the present disclosure, S21 is used as an index indicating a magnitude of coupling between the two antenna elements.

Figure 6:
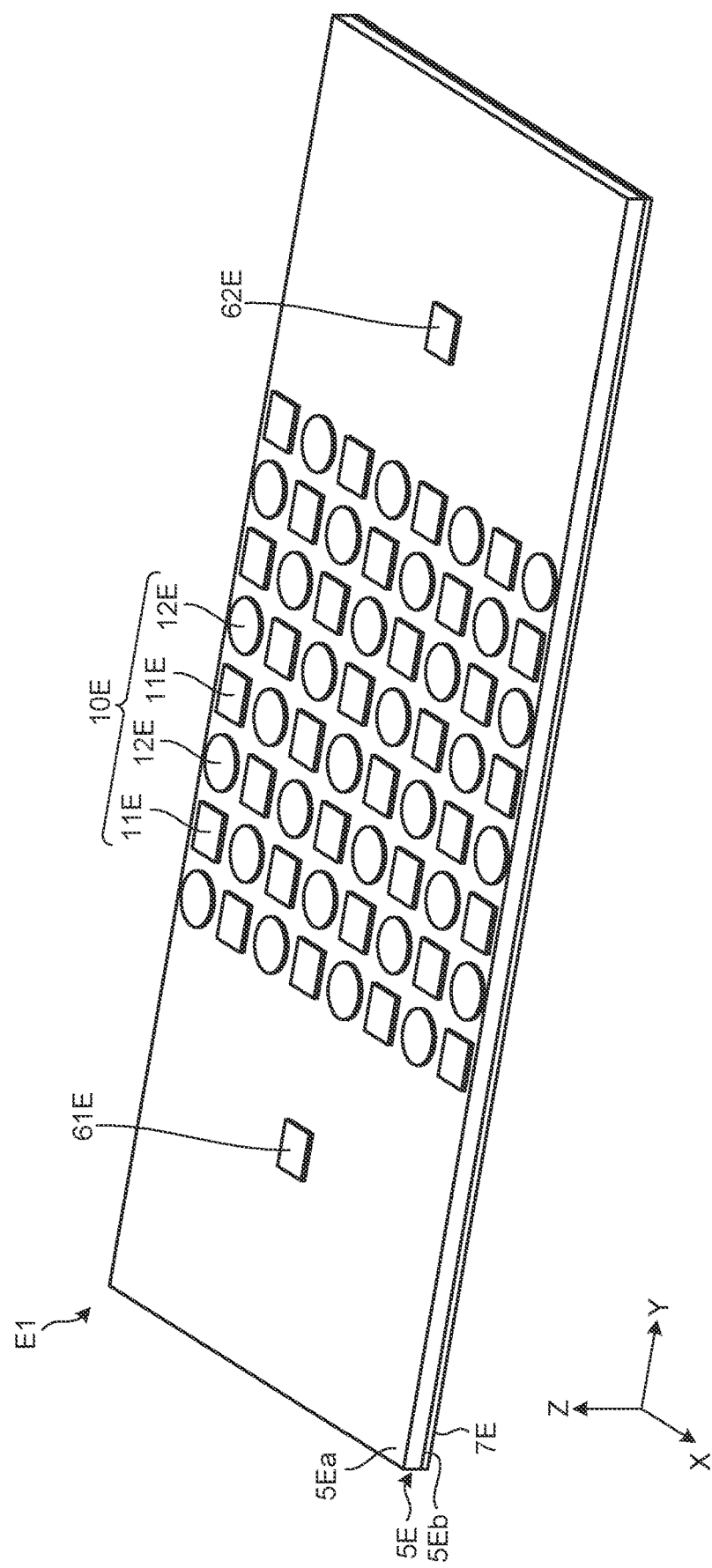
FIG. 6 is a diagram illustrating an example of a configuration for study ng an attenuation characteristic.
Figure 7:
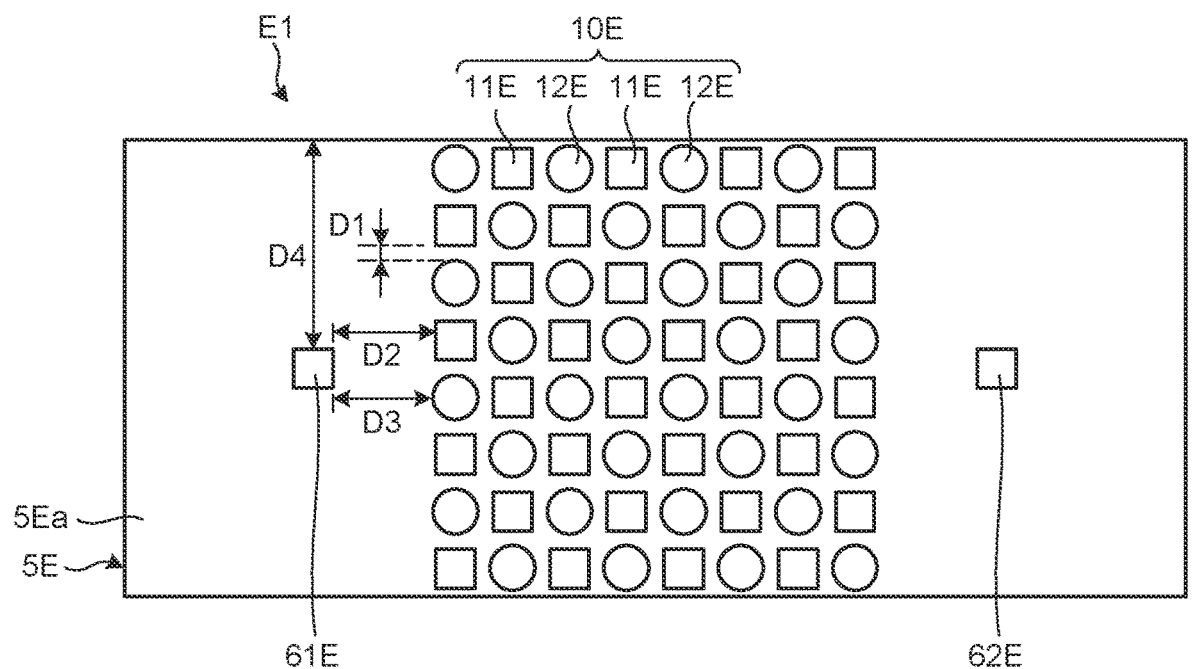
FIG. 7 is a diagram illustrating an example of a configuration for studying the attenuation characteristic.

A configuration E1 illustrated in FIGS. 6 and 7 is a configuration for studying the attenuation characteristics provided by the EBG element 10 in the antenna device 1 described above with reference to FIG. 1 and the like. In the configuration E1, two antenna elements 61E and 62E provided at intervals are provided on a main surface 5Ea or a substrate 5E. A plurality of EBG elements 10E is arranged between the antenna element 61E and the antenna element 62E. The plurality of EBG elements 10E includes a plurality of EBG elements 11E and a plurality of EBG elements 12E. The plurality of EBG elements 11E and the plurality of EBG elements 12E are arranged in the same manner as the plurality of EBG elements 11 and the plurality of EBG elements 12 (FIG. 1) except for the number of the elements and that these elements do not surround the antenna elements. A base plate 7E is provided on a back surface 5Eb of the substrate 5E.

A specific configuration of the configuration E1 will be described. The relative permittivity of the substrate 5A is 2.97. This relative permittivity is a value assuming LCP. The substrate 5A has a thickness of 0.1 mm. Both the shape of the antenna element 61E and the shape of the antenna element 62E are quadrangular shapes of 1.042 mm×1.042 mm (a resonance frequency is about 76 GHz to 77 GHz). The conductivity of the metal patterns constituting, the base plate 7E, the EBG elements 10E, the EBG elements 20E, the antenna element 61E, the antenna element 62E, and the base plate 75E is the conductivity of copper. The thickness of the metal pattern is 0.043 mm. The shape of the patch of each of the EBG elements 11E is a quadrangular shape of 1.031 mm×1.031 mm. The shape of the patch of each of the EBG elements 12S is a circular shape having a radius of 0.625. The vias (not illustrated) provided in the patches have a radius of 0.05 mm, and each of the vias is provided at a center of the patch.

Figure 8:
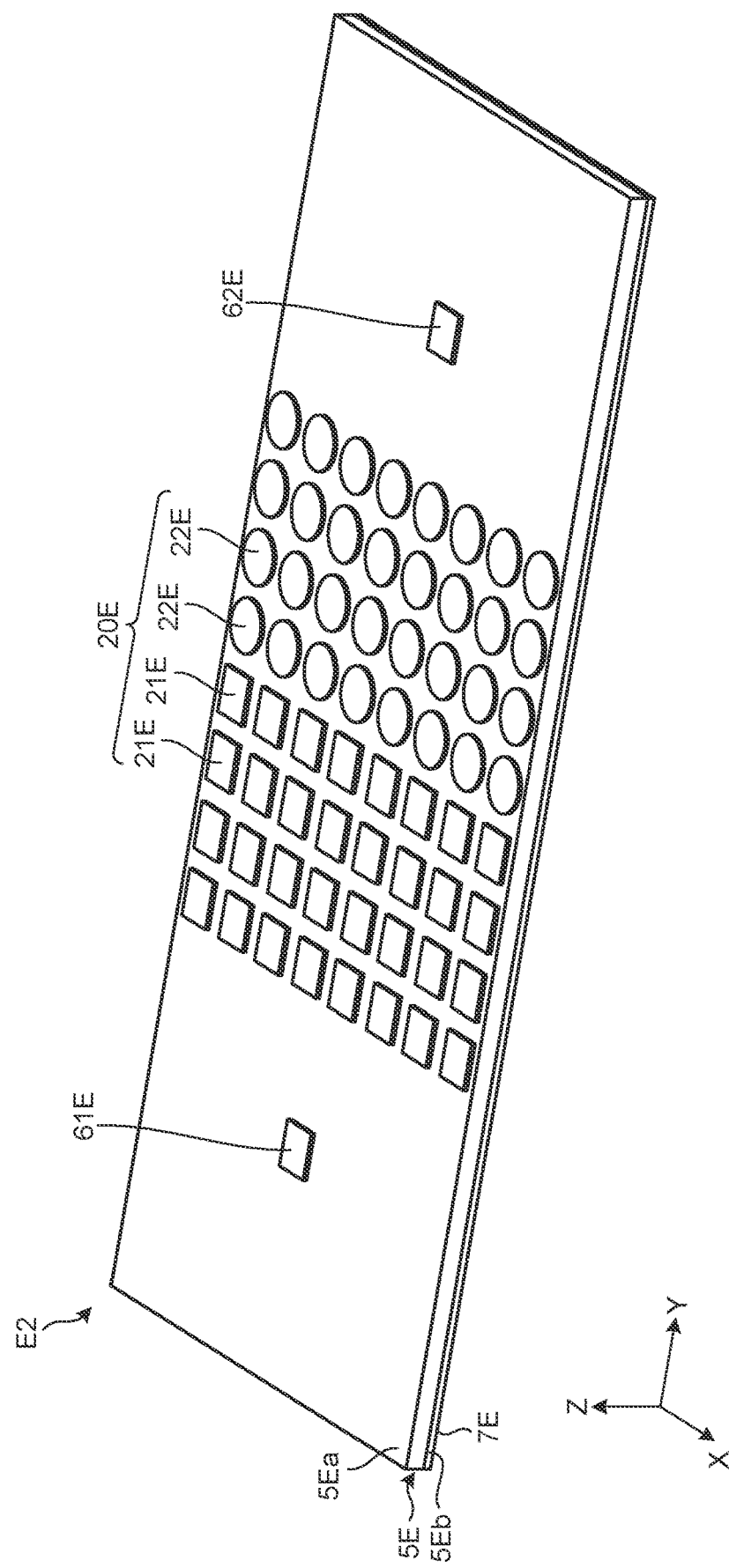
FIG. 8 is a diagram illustrating an example of a configuration for studying the attenuation characteristic.

Moreover, using distances D1 to D5 illustrated in FIG. 7, the distance D1 between edges of the adjacent EBG elements 11E and 12E is 0.125 mm. The distance D2 from the antenna element 61E to the nearest EBG element 11E is 2.714 mm. The same applies to the antenna element 62E. The distance D3 from the antenna element 61E to the nearest EBG element 12E is 2.604 mm. The same applies to the antenna element 62E. The distance D4 from the antenna element 61E to an edge of the substrate 55 the X-axis direction is 5.479 mm, and the distance D5 in the Y-axis direction is 4.479 mm. The same applies to the antenna element 62E. Note that the configurations illustrated in the following FIGS. 8 to 10 are similar to the configuration E1 except for parts different from the configuration and the configurations of the different parts can be estimated, and thus the description thereof will be omitted.

A configuration. E2 illustrated in FIG. 8 is a configuration for studying the attenuation characteristics provided by the EBG elements 20 in the antenna device 2 described above with reference to FIG. 5. The configuration E2 includes a plurality of EBG elements 20E instead of the plurality of EBG elements 10E (FIG. 7) as compared with the configuration E1. The plurality of EBG elements 20E includes a plurality of EBG elements 21E and a plurality of EBG elements 22E. The plurality of EBG elements 21E and the plurality of EBG elements 22E are arranged in the same manner as the plurality of EBG elements 21 and the plurality of EBG elements 22 (FIG. 5) except for the number of the elements and that these elements do not surround the antenna elements.

Figure 9:
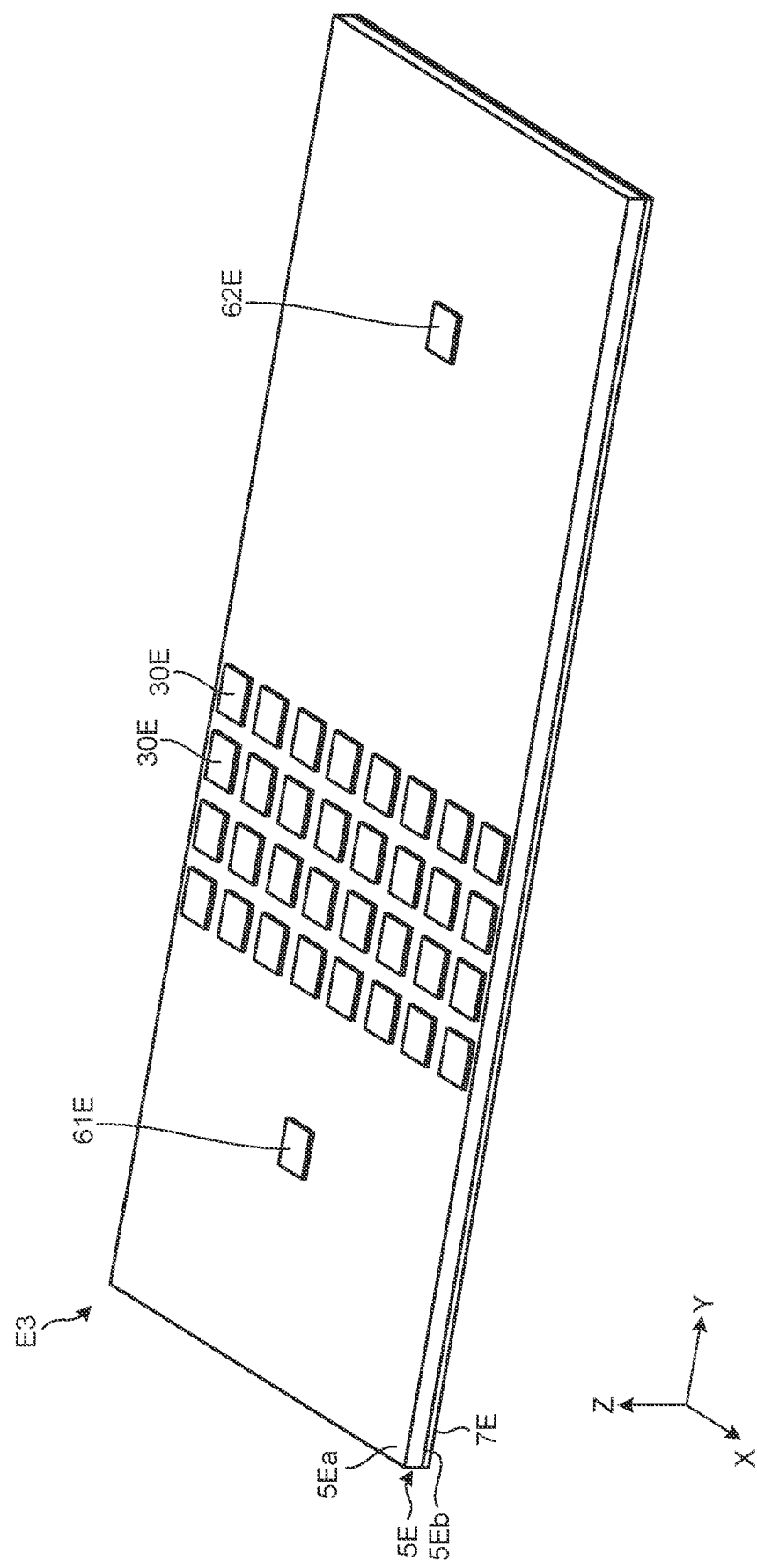
FIG. 9 is a diagram illustrating an example of a configuration for studying the attenuation characteristic.
Figure 10:
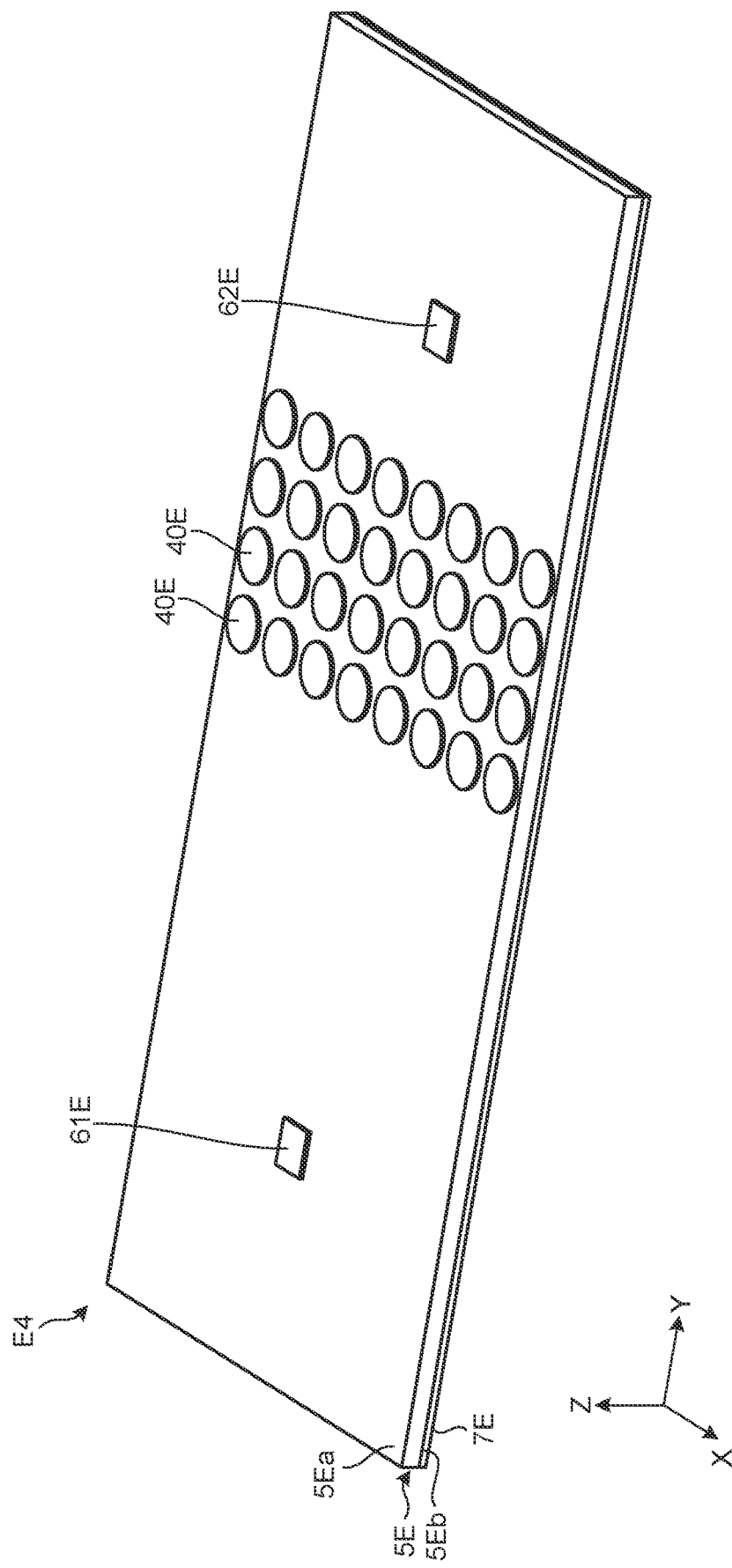
FIG. 10 is a diagram illustrating an example of a configuration for studying the attenuation characteristic.

A configuration E3 illustrated in FIG. 9 is a configuration of a comparative example. The configuration E3 includes a plurality of EBG elements 30E instead of the plurality of EBG elements 20E as compared with the configuration E2. The plurality of EBG elements 30E is the same as the plurality of EBG elements 21E (FIG. 8), and does not have a configuration corresponding to the plurality of EBG elements 22E.

A configuration E4 illustrated in. FIG. 10 is a configuration of a comparative example. The configuration E4 includes a plurality of EBG elements 40E instead of the plurality of EBG elements 20E as compared with the configuration E2. The plurality of EBG elements 40 is the same as the plurality of EBG elements 22E (FIG. 8), and does not have a configuration corresponding to the plurality of EBG elements 21E.

Figure 11:
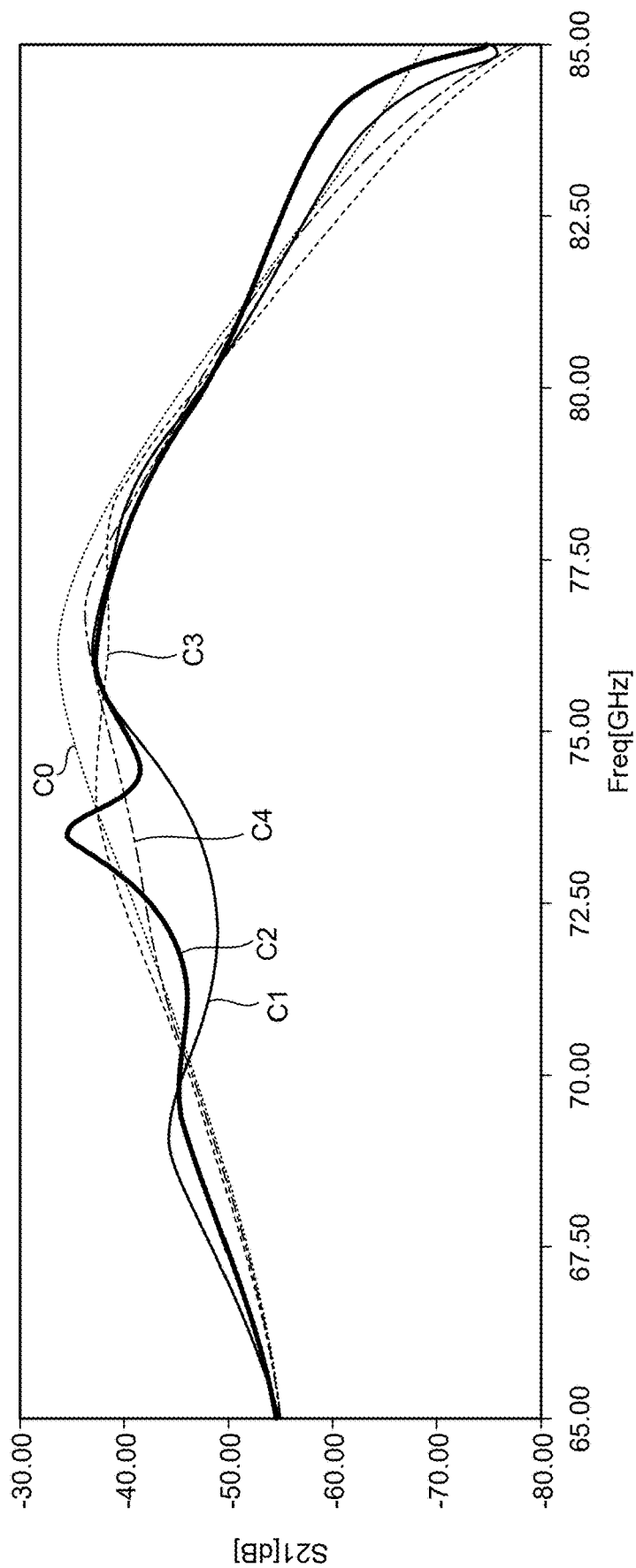
FIG. 11 is a diagram illustrating an example of a simulation result.
Figure 12:
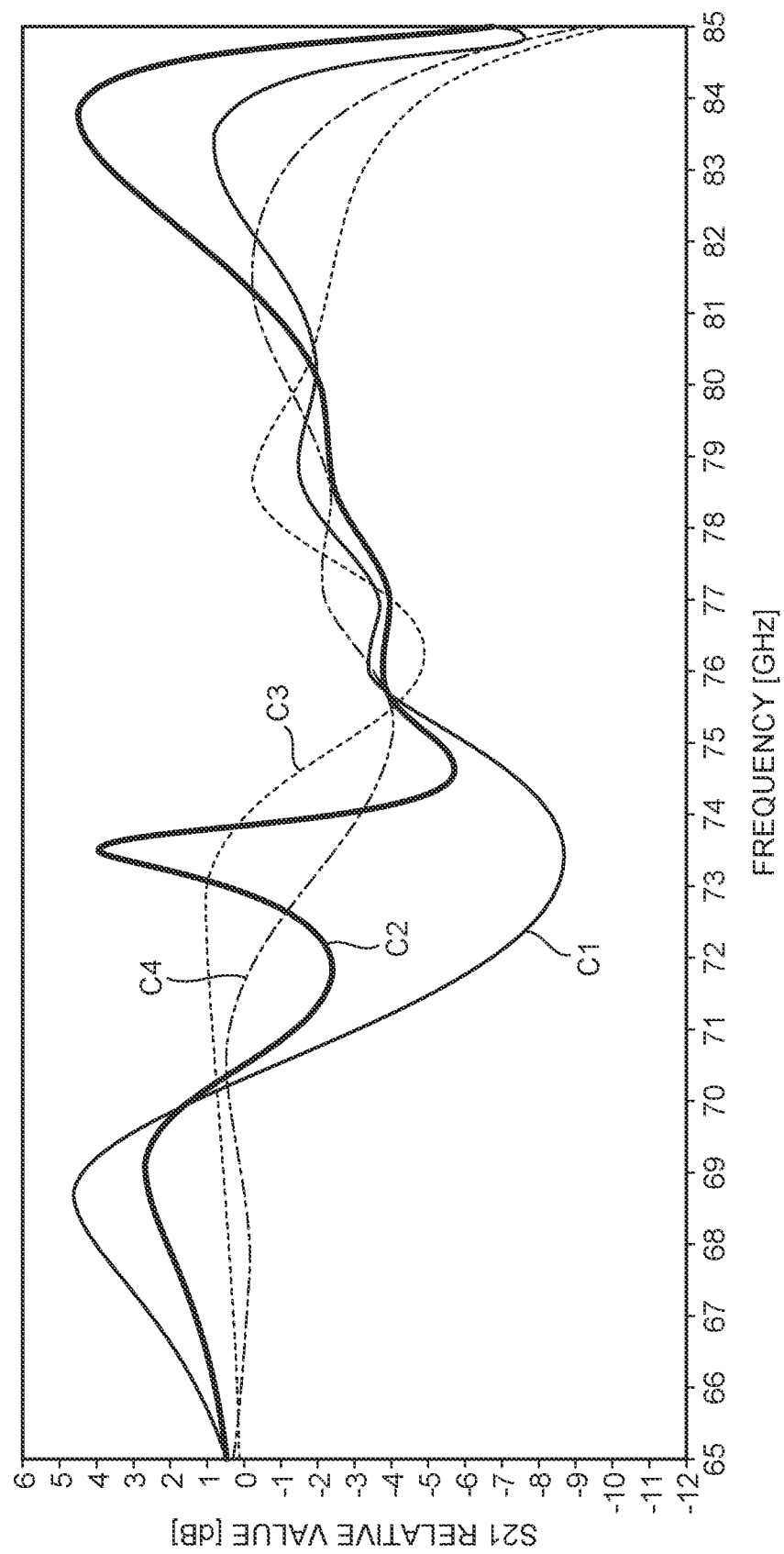
FIG. 12 is a diagram illustrating an example of a simulation result.

FIGS. 11 and 12 are diagrams illustrating examples of simulation results. A horizontal axis of the graph represents frequency, and a vertical axis of the graph represents S21 (db) from the antenna element 61E to the antenna element 62E. A frequency range is 65 GHz to 85 GHz.

A graph line C0 illustrated in FIG. 11 indicates S21 in a case where a plurality of EBG elements does not exist. Graph lines C1 to C4 indicate S21 of the configurations E1 to E4. Graph lines C1 to C4 illustrated in FIG. 12 indicate relative values of S21 of the configurations E1 to E4 with reference to S21 in a case where the plurality of EBG elements does not exist.

As illustrated in FIGS. 11 and 12, in the frequency range of about 76 GHz to 81 GHz, the electromagnetic wave attenuates to some extent in any of the configurations E1 to E4. In the frequency range of about 71 GHz to 86 GHz, a variation in a direction in which an attenuation amount is weakened is included in the configuration E2, but in both the configurations E1 and E2, the attenuation amount of the electromagnetic wave as a whole is larger than the attenuation amount in the configurations E3 and E4. That is, in the configurations E1 and E2, the attenuation bandwidth is wider and the attenuation amount is larger than those in the configurations E3 and E4, and the attenuation characteristics are improved. Particularly, the attenuation amount in the configuration E1 is larger than the attenuation amount in the configuration E2, and the attenuation characteristics in the configuration E1 are further improved than the attenuation characteristics in the configuration E2.

The improvement of the attenuation characteristics in the configurations E1 and E2 indicates the improvement of the attenuation characteristics in the antenna device 1 and the antenna device 2. From this, it can be seen that the attenuation characteristics are improved by the antenna device 1 and the antenna device 2.

The antenna device according to the embodiment described above is used by being mounted on, for example, a radar device. This will be described with reference to FIG. 13.

Figure 13:
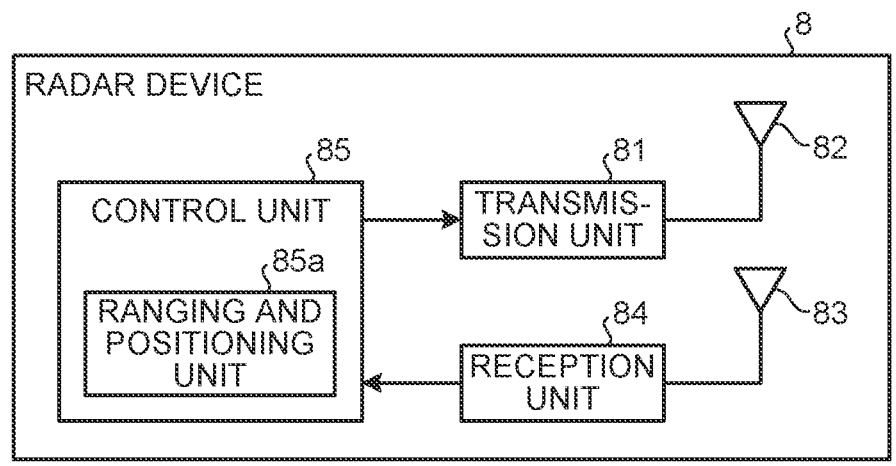
FIG. 13 is a diagram illustrating an example of a schematic configuration of a radar device.

FIG. 13 is a diagram illustrating an example of a schematic configuration of a radar device. A radar device 8 includes a transmission unit 81, an antenna device 82, an antenna device 83, a reception unit 84, and a control unit 85.

The transmission unit 81 performs transmission processing. The transmission processing may include modulation processing, frequency conversion processing (up-conversion), amplification processing, filtering processing, and the like. An example of the modulation is FM modulation, but various types of modulation suitable for radar may be used in addition to this.

The antenna device 82 and the antenna device 83 will be described. The antenna device 82 transmits (radiates) a transmission signal. The antenna device 83 receives a part of signals reflected by an object (not illustrated) among the transmission signals transmitted from the antenna device 82. Examples of the object include a vehicle, a person, and a building. The antenna device 1 (FIG. 1) or the antenna device 2 (FIG. 5) described above may be used as the antenna device 82 and the antenna device 83.

The reception unit 84 performs reception processing. The reception processing may include amplification processing, filtering processing, frequency conversion processing (down-conversion), demodulation processing, and the like.

The control unit 85 performs overall control of the radar device 8. The control by the control unit 85 includes control of transmission processing by the transmission unit 81 and control of reception processing by the reception unit 84. By controlling these transmission processing and reception processing, the control unit 85 detects (measures) a distance to an object or detects (measures) an orientation of an object, for example. As a functional block that performs such ranging and/or positioning, a ranging and positioning unit 85a is illustrated in FIG. 13. Since a method of ranging and positioning itself is known, a detailed description thereof will be omitted here.

The above-described configuration of the radar device 8 is an example, and may be appropriately changed. For example, the antenna device 82 and the antenna device 83 may include one antenna configured to be switchable between transmission and reception.

According to the radar device 8, since the backlobe suppressing effect is improved, ranging and positioning can be performed on a further object by increasing an energy of the main beam, for example. For an object present at the same distance, for example, ranging and positioning accuracy is improved. Therefore, the performance of the radar device 8 can be improved.

2. Application Example

The technique according to the present disclosure can be applied to various products. For example, the technique according to the present disclosure may be realized as a device mounted on any type of vehicle such as automobile, an electric vehicle, a hybrid electric vehicle, or a motorcycle.

Figure 14:
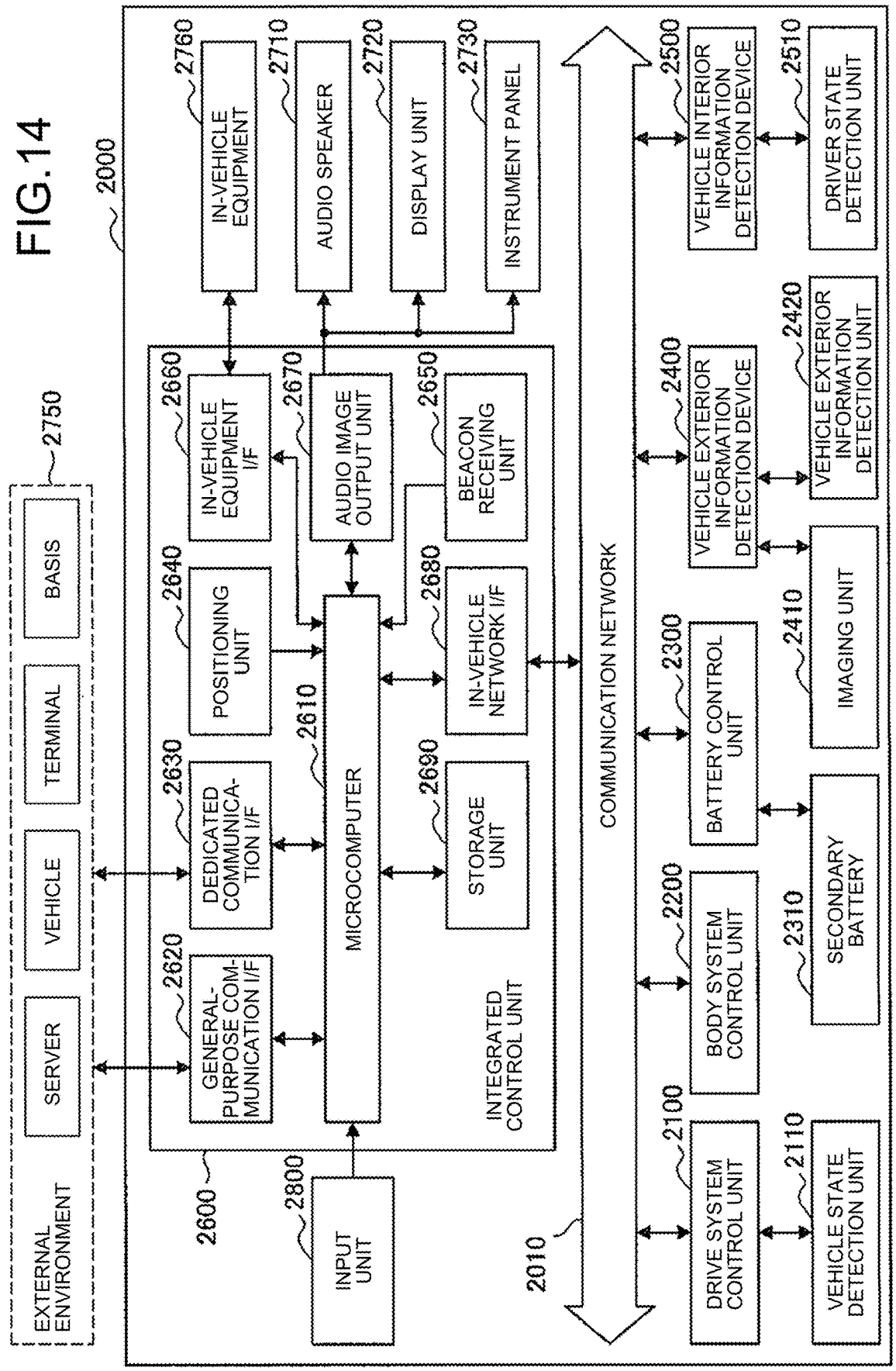
FIG. 14 is a block diagram illustrating an example of a schematic configuration of a vehicle control system.

FIG. 14 is a block diagram illustrating an example of a schematic configuration of a vehicle control system 2000 to which the technique according to the present disclosure can be applied. The vehicle control system 2000 includes a plurality of electronic control units connected via a communication network 2010. In the example illustrated in FIG. 14, the vehicle control system 2000 includes a drive system control unit 2100, a body system control unit 2200, a battery control unit 2300, a vehicle exterior information detection device 2400, a vehicle interior information detection device 2500, and an integrated control unit 2600. The communication network 2010 connecting the plurality of control units may be, for example, an in-vehicle communication network conforming to an arbitrary standard such as a controller area network (CAN), a local interconnect network (LIN), a local area network (LAN), or FlexRay (registered trademark).

Each control unit includes a microcomputer that performs arithmetic processing according to various programs, a storage unit that stores programs executed by the microcomputer, parameters used for various calculations, or the like, and a drive circuit that drives various devices to be controlled. Each control unit includes a network I/F for communicating with other control units via the communication network 2010, and a communication I/F for communicating with devices, sensors, or the like inside and outside the vehicle by wired communication or wireless communication. In FIG. 13, as a functional configuration of the integrated control unit 2600, a microcomputer 2610, a general-purpose communication I/F 2620, a dedicated communication I/F 2630, a positioning unit 2640, a beacon receiving unit 2650, an in-vehicle equipment I/F 2660, an audio image output unit 2670, an in-vehicle network I/F 2680, and a storage unit 2690 are illustrated. The other control units similarly include a microcomputer, a communication I/F, a storage unit, and the like.

The drive system control unit 2100 controls the operations of devices related to the drive system of the vehicle according to various programs. For example, the drive system control unit 2100 functions as a control device of a driving force generation device for generating a driving force of the vehicle such as an internal combustion engine or a driving motor, a driving force transmission mechanism for transmitting the driving force to wheels, a steering mechanism for adjusting a steering angle of the vehicle, a braking device for generating a braking force of the vehicle, and the like. The drive system control unit 2100 may have a function as a control device of an antilock brake system (ABS), an electronic stability control (ESC) or the like.

A vehicle state detection unit 2110 is connected to the drive system control unit 2100. The vehicle state detection unit 2110 includes, for example, at least one of a gyro sensor that detects an angular velocity of axial rotational motion of a vehicle body, an acceleration sensor that detects acceleration of the vehicle, or a sensor for detecting an operation amount of an accelerator pedal, an operation amount of a brake pedal, a steering angle of a steering wheel, an engine speed, a wheel rotation speed, or the like. The drive system control unit 2100 performs arithmetic processing using a signal input from the vehicle state detection unit 2110, and controls an internal combustion engine, a driving motor, an electric power steering device, a brake device, or the like.

The body system control unit 2200 controls operations of various devices mounted on the vehicle body according to various programs. For example, the body system control unit 2200 functions as a control device of a keyless entry system, a smart key system, a power window device, or various lamps such as a head lamp, a back lamp, a brake lamp, a blinker, or a fog lamp. In this case, radio waves or signals of various switches transmitted from a portable device that substitutes for a key can be input to the body system control unit 2200. The body system control unit 2200 receives an in-out of these radio waves or signals, and controls a door lock device, a power window device, a lamp, and the like of the vehicle.

The battery control unit 2300 controls a secondary battery 2310, which is a power supply source of the driving motor, according to various programs. For example, information such as a battery temperature, a battery output voltage, or a remaining capacity of a battery is input to the battery control unit 2300 from a battery device including the secondary battery 2310. The battery control unit 2300 performs arithmetic processing using these signals, and performs temperature adjustment control of the secondary battery 2310 or control of a cooling device or the like included in the battery device.

The vehicle exterior information detection device 2400 detects information outside the vehicle on which the vehicle control system 2000 is mounted. For example, at least one of an imaging unit 2410 and a vehicle exterior information detection unit 2420 is connected to the vehicle exterior information detection device 2400. The imaging unit 2410 includes at least one of a time of flight (ToF) camera, a stereo camera, a monocular camera, an infrared camera, and other cameras. The vehicle exterior information detection unit 2420 includes, for example, an environment sensor for detecting current weather or climate, or a surrounding information detection sensor for detecting another vehicle, an obstacle, a pedestrian, or the like around the vehicle on which the vehicle control system 2000 is mounted.

The environment sensor may be, for example, at least one of a raindrop sensor that detects rainy weather, a fog sensor that detects fog, a sunshine sensor that detects a degree of sunshine, and a snow sensor that detects snowfall. The surrounding information detection sensor may be at least one of an ultrasonic sensor, a radar device, and a light detection and ranging, laser imaging detection and ranging (LIDAR) device. The imaging unit 2410 and the vehicle exterior information detection unit 2420 may be provided as independent sensors or devices, or may be provided as a device in which a plurality of sensors or devices are integrated.

Figure 15:
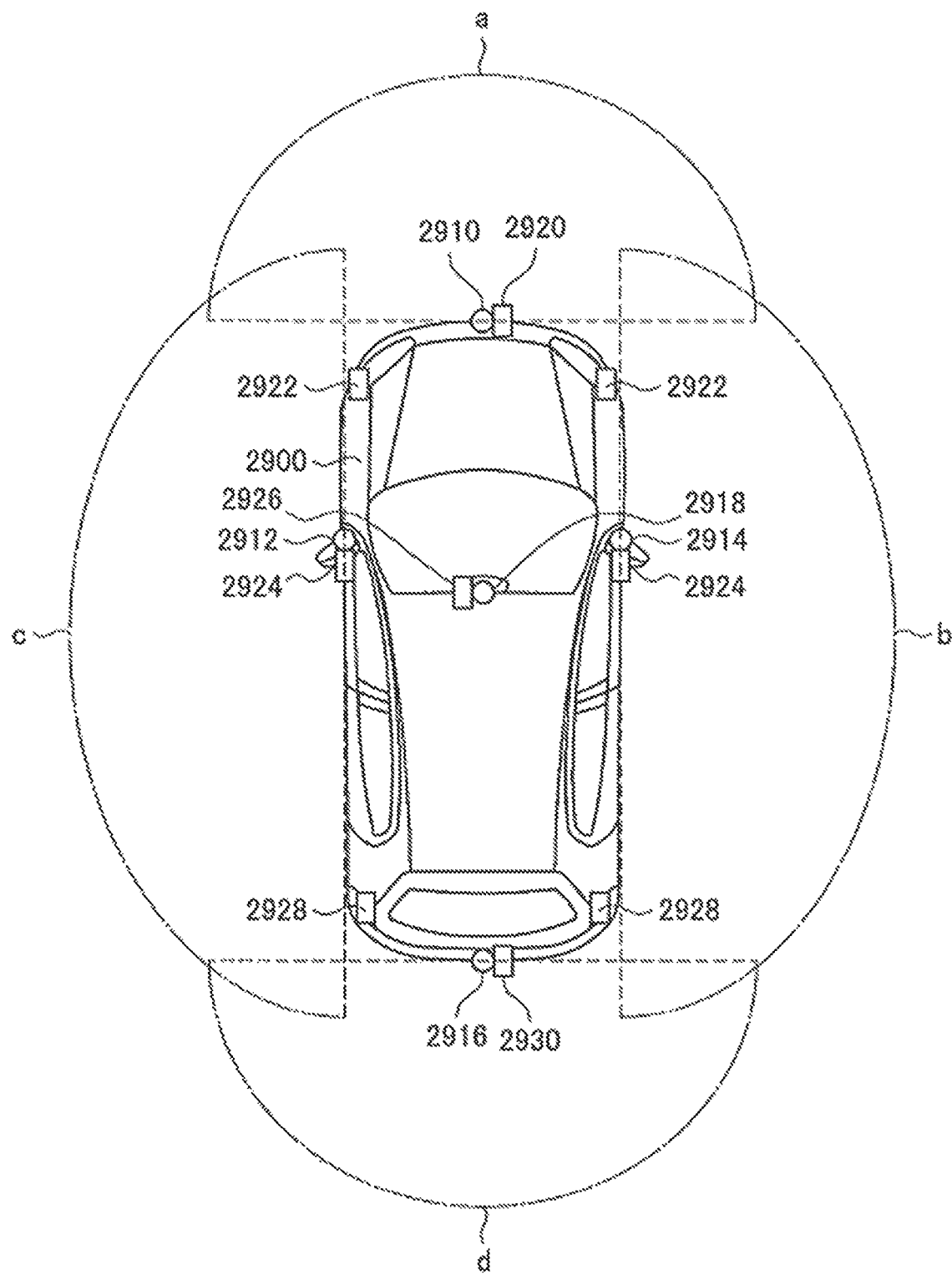
FIG. 15 is an explanatory diagram illustrating an example of installation positions of a vehicle exterior information detection unit and an imaging unit.

Here, FIG. 15 illustrates an example of installation positions of the imaging unit 2410 and the vehicle exterior information detection unit 2420. Imaging units 2910, 2912, 2914, 2916, and 2918 are provided, for example, at least one position of a front nose, a side mirror, a rear bumper, a back door, or an upper part of a windshield in a vehicle interior of the vehicle 2900. The imaging unit 2910 provided at the front nose and the imaging unit 2918 provided at the upper part of the windshield in the vehicle interior mainly acquire images in front of the vehicle 2900. The imaging units 2912 and 2914 provided at the side mirrors mainly acquire images of the sides of the vehicle 2900. The imaging unit 2916 provided on the rear bumper or the back door mainly acquires an image behind the vehicle 2900. The imaging unit 2918 provided at the upper part of the windshield in the vehicle interior is mainly used to detect a preceding vehicle, a pedestrian, an obstacle, a traffic light, a traffic sign, a lane, or the like.

Note that FIG. 15 illustrates an example of imaging ranges of the respective imaging units 2910, 2912, 2914, and 2916. An imaging range a indicates an imaging range of the imaging unit 2910 provided at the front nose, imaging ranges b and c indicate imaging ranges of the imaging units 2912 and 2914 provided at the side mirrors, respectively, and an imaging range d indicates an imaging range of the imaging unit 2916 provided at the rear bumper or the back door. For example, by superimposing image data captured by the imaging units 2910, 2912, 2914, and 2916, a bird's-eye view image of the vehicle 2900 viewed from above can be obtained.

Vehicle exterior information detection units 2920, 2922, 2924, 2926, 2928, and 2930 provided at the front, rear, sides, corners, and the upper part of the windshield in the vehicle interior of the vehicle 2900 may be, for example, ultrasonic sensors or radar devices. The vehicle exterior information detection units 2920, 2926, and 2930 provided at the front nose, the rear bumper, the back door, or the upper part of the windshield in the vehicle interior of the vehicle 2900 may be, for example, LIDAR devices. These vehicle exterior information detection units 2920 to 2930 are mainly used for detecting a preceding vehicle, a pedestrian, an obstacle, or the like.

Returning to FIG. 14, the description will be continued. The vehicle exterior information detection device 2400 causes the imaging unit 2410 to capture an image outside the vehicle, and receives the captured image data. Furthermore, the vehicle exterior information detection device 2400 receives detection information from the connected vehicle exterior information detection unit 2420. In a case where the vehicle exterior information detection unit 2420 is an ultrasonic sensor, a radar device, or a LIDAR device, the vehicle exterior information detection device 2400 transmits ultrasonic waves, electromagnetic waves, or the like, and receives information of received reflected waves. The vehicle exterior information detection device 2400 may perform object detection processing or distance detection processing of a person, a vehicle, an obstacle, a sign, a character on a road surface, or the like on the basis of the received information. The vehicle exterior information detection device 2400 may perform environment recognition processing of recognizing rainfall, fog, road surface conditions, or the like on the basis of the received information. The vehicle exterior information detection device 2400 may calculate a distance to an object outside the vehicle on the basis of the received information.

Furthermore, the vehicle exterior information detection device 2400 may perform image recognition processing or distance detection processing of recognizing a person, a vehicle, an obstacle, a sign, a character on a road surface, or the like on the basis of the received image data. The vehicle exterior information detection device 2400 may perform processing such as distortion correction or alignment on the received image data, and combine image data captured by different imaging units 2410 to generate a bird's-eye view image or a panoramic image. The vehicle exterior information detection device 2400 may perform viewpoint conversion processing using image data captured by the different imaging units 2410.

The vehicle interior information detection device 2500 detects information inside the vehicle. For example, a driver state detection unit 2510 that detects a state of a driver is connected to the vehicle interior information detection device 2500. The driver state detection unit 2510 may include a camera that images the driver, a biological sensor that detects biological information of the driver, a microphone that collects sound in the vehicle interior, or the like. The biological sensor is provided, for example, on a seat surface, a steering wheel, or the like, and detects biological information of an occupant sitting on a seat or a driver holding the steering wheel. The vehicle interior information detection device 2500 may calculate a degree of fatigue or a degree of concentration of the driver or may determine whether or not the driver is dozing on the basis of detection information input from the driver state detection unit 2510. The vehicle interior information detection device 2500 may perform processing such as noise canceling processing on a collected sound signal.

The integrated control unit 2600 controls the overall operation in the vehicle control system 2000 according to various programs. An input unit 2800 is connected to the integrated control unit 2600. The input unit 2800 is realized by, for example, a device such as a touch panel, a button, a microphone, a switch, or a lever that can be operated by an occupant for input. The input unit 2800 may be, for example, a remote control device using infrared rays or other radio waves, or an external connection device such as a mobile phone or a personal digital assistant (PDA) corresponding to the operation of the vehicle control system 2000. The input unit 2800 may be, for example, a camera, and in this case, the occupant can input information by gesture. Moreover, the input unit 2800 may include, for example, an input control circuit or the like that generates an input signal on the basis of information input by the occupant or the like using the input unit 2800 and outputs the input signal to the integrated control unit 2600. By operating the input unit 2800, the occupant or the like inputs various data to the vehicle control system. 2000 or instructs a processing operation.

The storage unit 2690 may include a random access memory (RAM) that stores various programs executed by the microcomputer, and a read only memory (ROM) that stores various parameters, calculation results, sensor values, or the like. Furthermore, the storage unit 2690 may be realized by a magnetic storage device such as a hard disc drive (HDD), a semiconductor storage device, an optical storage device, a magneto-optical storage device, or the like.

The general-purpose communication I/F 2620 is a general-purpose communication I/F that mediates communication with various devices existing in an external environment 2750. The general-purpose communication I/F 2620 may implement a cellular communication protocol such as global system of mobile communications (GSM) (registered trademark), WiMAX, long term evolution (LTE), or LTE-advanced (LTE-A), or another wireless communication protocol such as wireless LAN (also referred to as Wi-Fi (registered trademark)). The general-purpose communication I/F 2620 may be connected to a device (for example, an application server or a control server) existing on an external network (for example, the Internet, a cloud network, or a company-specific network) via, for example, a base station or an access point. Furthermore, the general-purpose communication I/F 2620 may be connected to a terminal (for example, a terminal of a pedestrian or a store, or a machine type communication (MTC) terminal) existing in the vicinity of the vehicle using, for example, a peer to peer (P2P) technology.

The dedicated communication I/F 2630 is a communication I/F that supports a communication protocol formulated for use in a vehicle. For example, the dedicated communication I/F 2630 may implement a standard protocol such as wireless access in vehicle environment (WAVE) which is a combination of IEEE802.11p of the lower layer and IEEE1609 of the upper layer, or dedicated short range communications (DSRC). Typically, the dedicated communication I/F 2630 performs V2X communication which is a concept including one or more of vehicle to vehicle communication, vehicle to infrastructure communication, and vehicle to pedestrian communication.

The positioning unit 2640 receives, for example, a global navigation satellite system (GNSS) signal from a GNSS satellite (for example, a global positioning system (GPS) signal from a GPS satellite), executes positioning, and generates position information including the latitude, longitude, and altitude of the vehicle. Note that the positioning unit 2640 may specify the current position by exchanging signals with a wireless access point, or may acquire position information from a terminal such as a mobile phone, a PHS, or a smartphone having a positioning function.

The beacon receiving unit 2650 receives, for example, radio waves or electromagnetic waves transmitted from a wireless station or the like installed on a road, and acquires information such as a current position, a traffic jam, a closed, road, a required time, or the like. Note that the function of the beacon receiving unit 2650 may be included in the dedicated communication I/F 2630 described above.

The in-vehicle equipment I/F 2660 is a communication interface that mediates connection between the microcomputer 2610 and various equipment existing in the vehicle. The in-vehicle equipment I/F 2660 may establish wireless connection using a wireless communication protocol such as wireless LAN, Bluetooth (registered trademark), near field communication (NFC), or wireless USB (WUSB). Furthermore, the in-vehicle equipment I/F 2660 may establish wired connection via a connection terminal (and, if necessary, a cable) not illustrated. The in-vehicle equipment I/F 2660 exchanges a control signal or a data signal with, for example, a mobile device or a wearable device possessed by an occupant, or an information device carried in or attached to the vehicle.

The in-vehicle network I/F 2680 is an interface that mediates communication between the microcomputer 2610 and the communication network 2010. The in-vehicle network I/F 2680 transmits and receives signals and the like in accordance with a predetermined protocol supported by the communication network 2010.

The microcomputer 2610 of the integrated control unit 2600 controls the vehicle control system 2000 according to various programs on the basis of information acquired via at least one of the general-purpose communication I/F 2620, the dedicated communication I/F 2630, the positioning unit 2640, the beacon receiving unit 2650, the in-vehicle equipment I/F 2660, and the in-vehicle network I/F 2680. For example, the microcomputer 2610 may calculate a control target value of the driving force generation device, the steering mechanism, or the braking device on the basis of the acquired information regarding the inside and outside of the vehicle, and output a control command to the drive system control unit 2100. For example, the microcomputer 2610 may perform cooperative control for the purpose of collision avoidance or impact mitigation of the vehicle, follow-up traveling based on an inter-vehicle distance, vehicle speed maintenance traveling, automatic driving, and the like.

The microcomputer 2610 may create local map information including peripheral information of the current position of the vehicle on the basis of information acquired via at least one of the general-purpose communication I/F 2620, the dedicated communication I/F 2630, the positioning unit 2640, the beacon receiving unit 2650, the in-vehicle equipment I/F 2660, and the in-vehicle network I/F 2680. Furthermore, the microcomputer 2610 may predict dancer such as collision of the vehicle, approach of a pedestrian or the like, or entry into a closed road on the basis of the acquired information, and generate a warning signal. The warning signal may be, for example, a signal for generating a warning sound or turning on a warning lamp.

The audio image output unit 2670 transmits an output signal of at least one of audio or an image to an output device capable of visually or audibly notifying an occupant of the vehicle or the outside of the vehicle of information. In the example of FIG. 14, an audio speaker 2710, a display unit 2720, and an instrument panel 2730 are illustrated as the output device. The display unit 2720 may include, for example, at least one of an on-board display and a head-up display. The display unit 2720 may have an augmented reality (AR) display function. The output device may be another device other than these devices, such as a headphone, a projector, or a lamp. In a case where the output device is a display device, the display device visually displays results obtained by various processing performed by the microcomputer 2610 or information received from another control unit in various formats such as text, images, tables, and graphs. Furthermore, in a case where the output, device is an audio output device, the audio output device converts an audio signal including reproduced sound data, acoustic data, or the like into an analog signal and aurally outputs the analog signal.

Note that, in the example illustrated in FIG. 14, at least two control units connected via the communication network 2010 may be integrated as one control unit. Alternatively, each control unit may include a plurality of control units. Moreover, the vehicle control system 2000 may include another control unit (not illustrated). Furthermore, in the above description, some or all of the functions performed by any of the control units may be provided to another control unit. That is, as long as information is transmitted and received via the communication network 2010, predetermined arithmetic processing may be performed by any control unit. Similarly, a sensor or a device connected to any of the control units may be connected to another control unit, and a plurality of control units may mutually transmit and receive detection information via the communication network 2010.

In the vehicle control system 2000 described above, the antenna device 1 and the antenna device 2 according to the present embodiment described with reference to FIGS. and 5 and the like, and further, the radar device 8 according to the present embodiment described with reference to FIG. 13 and the like can be applied to the vehicle exterior information detection unit 2420 of the application example illustrated in FIG. 14. That is, for example, the detection performance can be improved by using the antenna device 1, the antenna device 2, or the radar device 8 in which the backlobe suppression effect improved.

3. Effects

The antenna device according to the above-described embodiment is specified as follows, for example. As described with reference to FIG. 1 and the like, the antenna device 1 includes the antenna element 6 and the plurality of EBG elements 10. The plurality of EBG elements 10 includes the plurality of EBG elements 11 and the plurality of EBG elements 12 having a structure different from a structure of the plurality of EBG elements 11.

According to the antenna device 1 described above, since the plurality of EBG elements 12 has a different structure from the plurality of EBG elements 11, the attenuation characteristics provided by the plurality of EBG elements 12 are different from the attenuation characteristics provided by the plurality of EBG elements 11. Therefore, attenuation characteristics combining two different attenuation characteristics can be obtained. For example, as compared with a case where only one attenuation characteristic is given, the attenuation characteristic is improved such that a wider attenuation bandwidth is obtained or a larger attenuation amount is obtained. By improving the attenuation characteristics, for example, the effect of suppressing backlobes can be improved.

As described with reference to FIG. 1 and the like, the plurality of EBG elements 10 may surround the antenna element 6. As a result, in a plane (for example, XY plane) including the antenna element 6 and the EBG elements 10, an electromagnetic wave traveling from the antenna element 6 toward the plane direction can be attenuated.

As described with reference to FIG. 1 and the like, each of the plurality of EBG elements 11 and each of the plurality of EBG elements 12 may be alternately arranged. For example, the plurality of EBG elements 11 and the plurality of EBG elements 12 having different structures can be arranged in this manner. As described with reference to FIG. 5 and the like, the plurality of EBG elements 21 may surround the antenna element 6, and the plurality of EBG elements 22 may surround the EBG elements 21. In this manner, the plurality of EBG elements 21 and the plurality of EBG elements 22 having different structures can be arranged.

As described with reference to FIG. 1 and the like, the antenna element 6 and the plurality of EBG elements 10 may be arranged on the main surface 5a of the substrate 5. Thus, the antenna device 1 can be used as a planar antenna. There is an advantage that the antenna device 1 can be made compact.

As described with reference to FIG. 1 and the like, the plurality of EBG elements 11 may be provided to be separated from the antenna element 6, and the separation distance between the plurality of EBG elements 10 and the antenna element 6 may be larger than the separation distance between the adjacent EBG elements 11. This allows the main beam to have a certain width.

As described with reference to FIG. 1 and the like, the region where the plurality of EBG elements 11 is provided may include the edge part of the substrate 5. This makes it easy to secure an arrangement area of the plurality of EBG elements 10.

As described width reference to FIGS. 3 and 4 and the like, each of the plurality of EBG elements 10 may include the patch 10a provided on the main surface 5a of the substrate 5 and the via 10b that connects the base plate 7 provided on the back surface 5b of the substrate 5 and the patch 10a. For example, by using such a mushroom structure, the plurality of EBG elements 10 can be incorporated into the planar antenna.

The parameter that defines the structure of the plurality of EBG elements 10 includes at least one of a size of the patch 10a, a size of the via 10b, and an interval between the patches 10a of the adjacent EBG elements 10, and the parameter that defines the structure of the plurality of EBG elements 12 may be different from the parameter that defines the structure of the plurality of EBG elements 11. For example, in this manner, the plurality of EBG elements 12 can have a structure different from that of the plurality of EBG elements 11.

As described with reference to FIG. 13 and the like, the antenna device 82 and the antenna device 83 may be mounted on the radar device 8. As a result, the performance of the radar device 8 can be improved.

As described with reference to FIGS. 14 and 15 and the like, the antenna device may be mounted on a vehicle. As a result, the detection performance of the vehicle exterior information detection unit can be improved.

Figure 16:
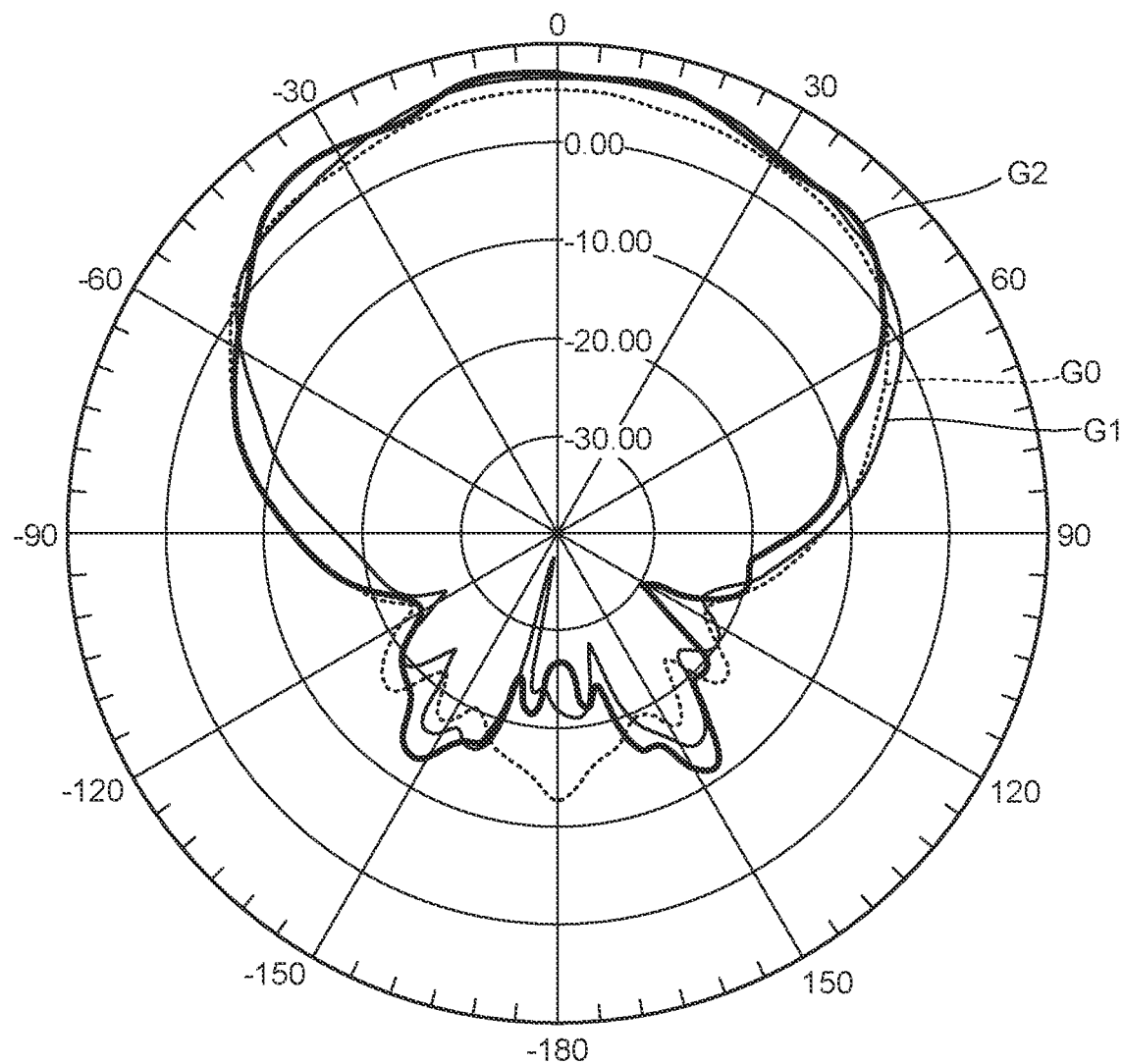
FIG. 16 is a diagram illustrating an example of a simulation result.
Figure 17:
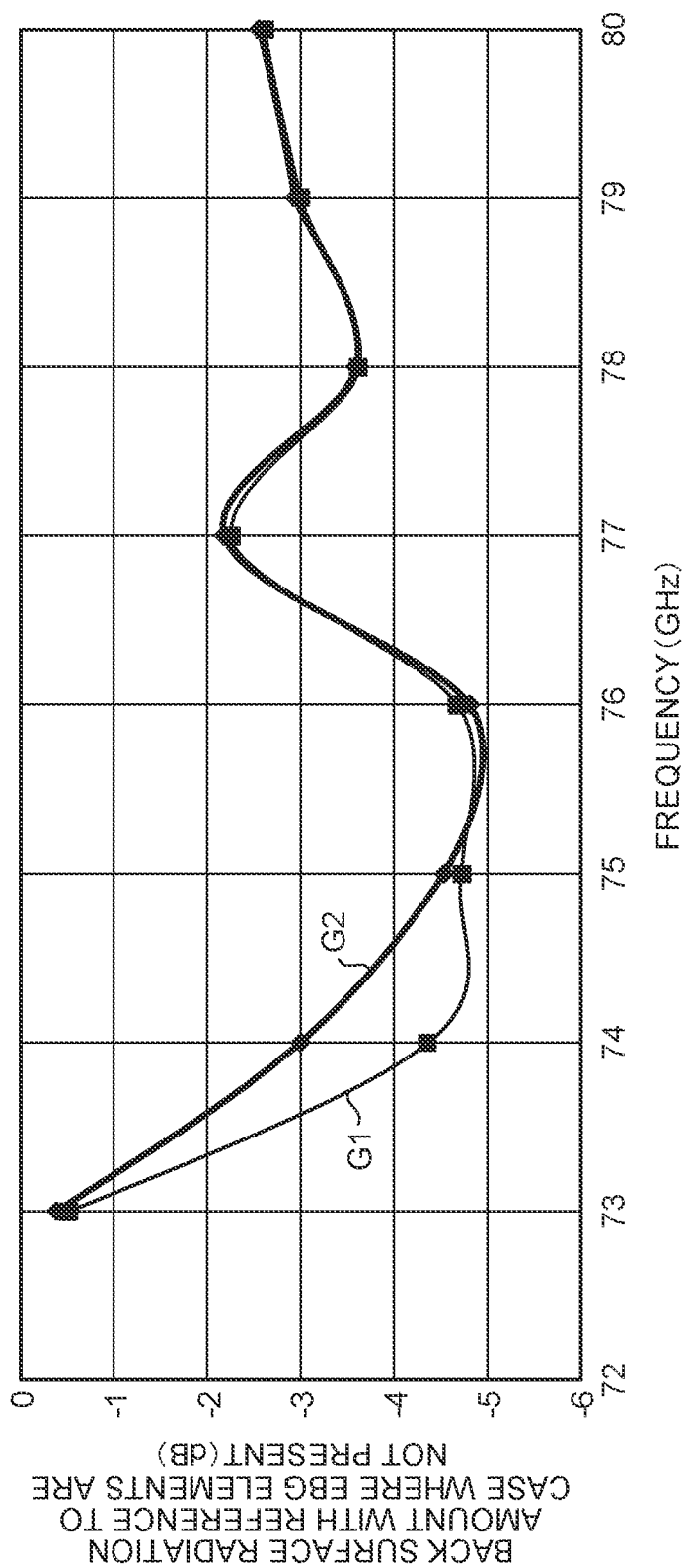
FIG. 17 is a diagram illustrating an example of a simulation result.

Finally, an example of a simulation result of the antenna device (FIG. 1) will be described with reference to FIGS. 16 and 17. FIGS. 16 and 17 are diagrams illustrating examples of simulation results. FIG. 16 illustrates a simulation result of directivity at a frequency of 76 GHz. An upper side of the graph indicates the directivity on the side of the main surface 5a (side of the Z-axis positive direction) of the substrate 5, and a lower side of the graph indicates the directivity on the side of the back surface 5b (side of the Z-axis negative direction) of the substrate 5. A graph line G0 indicates directivity of a configuration in which the plurality of EBG elements 10 does not exist in the antenna device 1 (FIG. 1). A graph line G1 indicates directivity of a configuration in which the plurality of EBG elements 11 and the plurality of huh elements 12 are mixed as in the antenna device 1. A graph line G2 indicates directivity of a configuration in which all of the plurality of EBG elements 10 are the plurality of EBG elements 11 in the antenna device 1.

In the graph of FIG. 17, a horizontal axis represents a frequency, and a vertical axis represents a back surface radiation amount (dB). The horizontal axis of the graph indicates a frequency, and the vertical axis of the graph indicates a back surface radiation amount (dB) when a radiation amount of a configuration in which the plurality of EBG elements 10 does not exist in the antenna device 1 is set as a reference.

As illustrated in FIGS. 16 and 17, it can be seen that the amount of radiation to the side of the back surface 5b f the substrate 5 is smaller in the case where the EBG elements are present (graph line G1 and graph line G2) than in the case where the EBG elements are not present (graph line G1). Furthermore, it can be seen that the band in which the radiation amount decreases is wider in the configuration (graph line G1) including the plurality of EBG elements 11 and the plurality of EBG elements 12 having different structures than in the configuration (graph line G2) including only the plurality of EBG elements 11 having the same structure (in this example, around 74 GHz).

Note that the effects described in the present disclosure are merely examples and are not limited to the disclosed contents. There may be other effects.

Although the embodiments of the present disclosure have been described above, the technical scope of the present disclosure is not limited to the above-described embodiments as it is, and various modifications can be made without departing from the gist of the present disclosure. Furthermore, components of different embodiments and modification examples may be appropriately combined.

Furthermore, the effects of each embodiment described in the present specification are merely examples and are not limited, and other effects may be provided.

In the above embodiment, an example has been described in which the plurality of EBG elements includes two types of the plurality of EBG elements having different structures. However, the plurality of EBG elements may include three or more types of EBG elements each having a different structure.

Note that the present technique can also have the following configurations.

(1)
Antenna device comprising:
an antenna element; and
a plurality of EBG elements,
wherein the plurality of EBG elements includes:
a plurality of first EBG elements; and
a plurality of second EBG elements having a structure different from a structure of the plurality of first EBG elements.

(2)
The antenna device according to (1), wherein
the plurality of EBG elements surrounds the antenna element.

(3)
The antenna device according to (1) or (2), wherein
each of the plurality of first EBG elements and each of the plurality of second EBG elements are alternately arranged.

(4)
The antenna device according to or (2), wherein
the plurality of first EBG elements surrounds the antenna element, and
the plurality of second EBG elements surrounds the plurality of first EBG elements.

(5)
The antenna device according to any one of (1) to (4), wherein
the antenna element and the plurality of EBG elements are arranged on a main surface of a substrate.

(6)
The antenna device according to (5), wherein
the plurality of EBG elements is provided apart from the antenna element, and
a separation distance between the plurality of EBG elements and the antenna element is larger than a separation distance between adjacent EBG elements among the plurality of EBG elements.

(7)
The antenna device according to (5) or (6), wherein
a region where the plurality of EBG elements is provided includes an edge part of the substrate.

(8)
The antenna device according to any one of (5) to (7), wherein
each of the plurality of EBG elements includes:
a patch provided on the main surface of the substrate; and
a via that connects a base plate provided on a back surface of the substrate and the patch.

(9)
The antenna device according to (8), wherein
a parameter defining a structure of the plurality of EBG elements includes at least one of a size of the patch, a size of the via, and an interval between the patches of the EBG elements adjacent to each other, and
the parameter defining the structure of the plurality of second EBG elements is different from the parameter defining the plurality of first EBG elements.

(10)
The antenna device according to any one of (1) to (7), wherein the antenna device is mounted on a radar device.

(11)
The antenna device according to any one of (1) to (8), wherein the antenna device is mounted on a vehicle.

REFERENCE SIGNS LIST

1 ANTENNA DEVICE
2 ANTENNA DEVICE
5 SUBSTRATE
6 ANTENNA ELEMENT
7 BASE PLATE
6 RADAR DEVICE
10 EBG ELEMENT
11 EBG ELEMENT
12 EBG ELEMENT
20 EBG ELEMENT
21 EBG ELEMENT
22 EBG ELEMENT
81 TRANSMISSION UNIT
82 ANTENNA DEVICE
83 ANTENNA DEVICE
84 RECEPTION UNIT
85 CONTROL UNIT
85a RANGING AND POSITIONING UNIT

The invention claimed is:

1. An antenna device comprising:
a substrate including a main surface extending in a first direction and a second direction that is orthogonal to the first direction;
an antenna element disposed on the main surface; and
a plurality of Electromagnetic Band Gap (EBG) elements that surround the antenna element, the plurality of EBG elements including
a plurality of first EBG elements having a first structure; and
a plurality of second EBG elements having a second structure different from the first structure,
wherein the plurality of EBG elements are configured to attenuate an electromagnetic wave traveling from the antenna element toward a first edge of the substrate in the first direction and from the antenna element toward a second edge of the substrate in the second direction,
wherein two of the plurality of first EBG elements are separated from each other in the first direction by only one of the plurality of second EBG elements, and
wherein two of the plurality of second EBG elements are separated from each other in the first direction by only one of the plurality of first EBG elements.

2. The antenna device according to claim 1, wherein
the plurality of second EBG elements surrounds the plurality of first EBG elements.

3. The antenna device according to claim 1, wherein
the plurality of EBG elements is provided apart from the antenna element, and
a separation distance between the plurality of EBG elements and the antenna element is larger than a separation distance between adjacent EBG elements among the plurality of EBG elements.

4. The antenna device according to claim 1, wherein
a region where the plurality of EBG elements is provided includes an edge part of the substrate.

5. The antenna device according to claim 1, wherein
each of the plurality of EBG elements includes:
a patch provided on the main surface of the substrate; and
a via that connects a base plate provided on a back surface of the substrate and the patch.

6. The antenna device according to claim 5, wherein
a parameter defining a structure of the plurality of EBG elements includes at least one of a size of the patch, a size of the via, and an interval between the patches of the plurality of EBG elements adjacent to each other, and
the parameter defining the structure of the plurality of second EBG elements is different from the parameter defining the plurality of first EBG elements.

7. The antenna device according to claim 1, wherein
the antenna device is mounted on a radar device.

8. The antenna device according to claim 1, wherein
the antenna device is mounted on a vehicle.

9. The antenna device according to claim 1, wherein
a first portion of the plurality of first EBG elements are directly adjacent to the antenna element in a Y direction, and
a first portion of the plurality of second EBG elements are directly adjacent to the antenna element in the Y direction.

10. The antenna device according to claim 1, wherein a gap is defined between one of the plurality of first EBG elements and one of the plurality of second EBG elements.

11. The antenna device according to claim 1, wherein each of the plurality of first EBG elements and each of the plurality of second EBG elements are alternately arranged.

12. The antenna device according to claim 1, wherein
a first portion of the plurality of first EBG elements are directly adjacent to the antenna element in an X direction, and
a first portion of the plurality of second EBG elements are directly adjacent to the antenna element in the X direction.

13. An antenna device comprising:
a substrate including a main surface extending in a first direction and a second direction that is orthogonal to the first direction;
an antenna element disposed on the main surface; and
a plurality of Electromagnetic Band Gap (EBG) elements that surround the antenna element, the plurality of EBG elements including
a plurality of first EBG elements having a first structure; and
a plurality of second EBG elements having a second structure different from the first structure
wherein the plurality of EBG elements are configured to attenuate an electromagnetic wave traveling from the antenna element toward a first edge of the substrate in the first direction and from the antenna element toward a second edge of the substrate in the second direction, wherein
each of the plurality of first EBG elements and each of the plurality of second EBG elements are alternately arranged.

14. The antenna device according to claim 13, wherein the plurality of second EBG elements surrounds the plurality of first EBG elements.

15. The antenna device according to claim 13, wherein the plurality of EBG elements is provided apart from the antenna element, and
a separation distance between the plurality of EBG elements and the antenna element is larger than a separation distance between adjacent EBG elements among the plurality of EBG elements.

16. The antenna device according to claim 13, wherein a region where the plurality of EBG elements is provided includes an edge part of the substrate.

17. The antenna device according to claim 13, wherein each of the plurality of EBG elements includes:
a patch provided on the main surface of the substrate; and
a via that connects a base plate provided on a back surface of the substrate and the patch.

18. An antenna device comprising:
a substrate including a main surface extending in a first direction and a second direction that is orthogonal to the first direction;
an antenna element disposed on the main surface; and
a plurality of Electromagnetic Band Gap (EBG) elements that surround the antenna element, the plurality of EBG elements including
a plurality of first EBG elements having a first structure; and
a plurality of second EBG elements having a second structure different from the first structure
wherein the plurality of EBG elements are configured to attenuate an electromagnetic wave traveling from the antenna element toward a first edge of the substrate in the first direction and from the antenna element toward a second edge of the substrate in the second direction, wherein
a first portion of the plurality of first EBG elements are directly adjacent to the antenna element in an X direction, and
a first portion of the plurality of second EBG elements are directly adjacent to the antenna element in the X direction.

19. The antenna device according to claim 18, wherein
a second portion of the plurality of first EBG elements are directly adjacent to the antenna element in a Y direction, and
a second portion of the plurality of second EBG elements are directly adjacent to the antenna element in the Y direction.

20. The antenna device according to claim 18, wherein
a second portion of the plurality of first EBG elements are directly adjacent to the antenna element in a Y direction, and
a second portion of the plurality of second EBG elements are directly adjacent to the antenna element in the Y direction.

* * * * *